June 16, 1959 A. S. KUHN 2,891,204
METALLIZED ELECTRICAL CAPACITOR
Filed Oct. 27, 1954 2 Sheets-Sheet 1

INVENTOR.
ALFRED S. KUHN
BY
*Vandeventer & Shively,*
ATTORNEYS

INVENTOR.
ALFRED S. KUHN
BY
ATTORNEYS

United States Patent Office 2,891,204
Patented June 16, 1959

2,891,204

METALLIZED ELECTRICAL CAPACITOR

Alfred S. Kuhn, New York, N.Y.

Application October 27, 1954, Serial No. 464,949

5 Claims. (Cl. 317—260)

This invention relates to wound capacitors of the metallized dielectric type and to a method of making same.

One object of the invention is to simplify the construction of such capacitors and thereby reduce the cost of manufacture.

Wound capacitors of the metallized type usually consist of two strips of a dielectric such as kraft tissue paper or a synthetic such as polystyrene, polyethylene or polyethylene terephthalate (known commercially as "Mylar"), having deposited upon one surface of each strip an extremely thin coating of metal; usually aluminum. The deposited metal had previously been vaporized in a vacuum chamber from which air had been excluded and then allowed to condense evenly over one surface of the dielectric material. The paper is then cut into strips of the desired width.

After demetallizing a narrow margin of metal from each strip, two or more such strips are rolled together to form a capacitor, often termed a condenser. This construction is now in wide use and has been fully described in numerous patents and publications.

Because of the extreme thinness of the metal electrodes formed by this metallizing process such capacitors are very compact. They also possess self-healing properties that protect them from short-circuiting when excessive potentials are applied. However, they are quite expensive to manufacture. This is in part due to the laborious operation of demetallizing a narrow margin along one edge of each strip so as to insure adequate insulation between opposite electrodes. This operation is usually performed by burning off the undesired metal with an electric spark that vaporizes this metal, without damaging the dielectric. This frequently results in an irregular or ragged line of demarcation.

The instant invention overcomes the need for removing any metal from the edges of the dielectric strips. At the same time it maintains the required insulation between opposite electrodes.

One method of accomplishing this is to longitudinally fold each metallized strip ever so slightly off the centerline; thereby exposing a very narrow margin of metallized paper or other suitable dielectric material along one edge of each strip. The paper is folded with the metal faces of each half of the strip in surface contact and the insulated, unmetallized, surfaces on the outside of the fold. Two such folded strips are placed next to each other with their exposed metallized margins protrduing laterally and oppositely beyond the body of the strips. These metallized margins form the terminal electrodes and have sufficient surface area so that they can be readily united with margins of other turns after rolling into cylindrical form. During rolling, these exposed metallized margins may be edge-turned slightly to further expose the surfaces, which are then bonded together by a metallic spray or dipped into molten solder. Metal end-caps, to which pigtails may be attached, may then be soldered to the end surfaces of the capacitor to form the terminal electrodes. This produces a condenser of minimum resistance and inductance.

While it has been known to fold metallized paper strips in capacitors of this type, it has been done either to secure more rigid terminals or to form a capacitor from a single sheet that has been metallized on both sides. In all cases it has been necessary to remove a narrow strip of metal from at least one edge of each metallized strip or it has been necessary to interpose an additional sheet of insulation between the metallized strips to preclude the possibility of short-circuit.

By following the method herein disclosed the desired result is secured without encountering the foregoing difficulties.

A fuller understanding of the invention will be obtained from the following detailed description and the annexed drawings.

Figure 1:
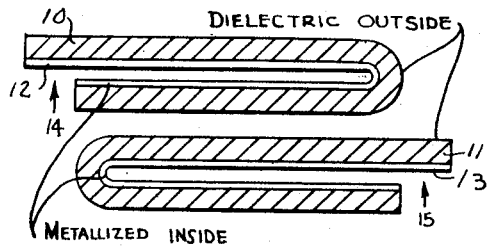
Figure 1 is a sectional end-view of two metallized sheets after folding but before rolling and with the metal surfaces within the fold.

It will be noted that the thickness of the dielectric sheets or strips and their metal coatings are greatly exaggerated in the drawings for the sake of clarity. The actual thickness of said sheets or strips and the metallized coatings is immaterial to the present invention and the usual thicknesses are well known in the art. For "Mylar" as dielectric see article in "Material and Methods" March 1954; page 104. They are therefore not specifically referred to here.

It will also be noted that while two sheets or strips have been shown as comprising a capacitor, that as many sheets or strips as desired may be used.

Referring to Figure 1, two strips of thin kraft paper 10, 11, or of a polyester film such as "Mylar" have been metallized on one surface only as shown at 12, 13. Then after being cut to the desired width each sheet is individually folded along a line just to one side of the longitudinal center-line, so that after folding, the metallized surfaces come into contact with each other on the inside of each fold.

Figure 5:
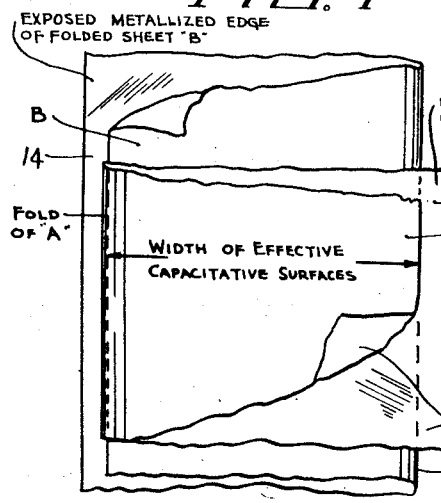
Figure 5 is a plan view showing two such folded sheets or strips as shown in Figure 1 in proper relationship before rolling into a capacitor.

The sheets 10 and 11 are then superimposed, one on the other, in slightly off-set relation as shown in Figures 1 and 5. The projecting edge of each folded strip exposes a metallized margin to view and is located to left and right respectively at 14, 15 of Figures 1 and 5. The two sheets are then rolled tightly together in the usual manner to form a cylindrically shaped capacitor, Figure 6.

Figure 6:
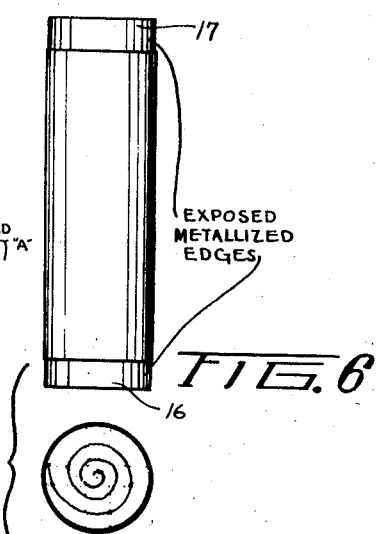
Figure 6 shows a capacitor completely rolled and ready for impregnation and the spraying of metal to unite the metallized spiraled turns at each end of the condenser.

The spirally wound metallically coated edges, 16, 17 of Figure 6, exposed at each end of the capacitor are then sprayed with molten metal or solder so as to interconnect all of the turns electrically; thereby minimizing its resistance and inductance.

It will be observed that this arrangement (of two folded strips) as shown in Figure 1 produces a capacitor with two thicknesses of dielectric interposed between metallized surfaces of opposite polarity, resulting in greater dielectric strength but reduced capacity per unit area.

Figure 2:
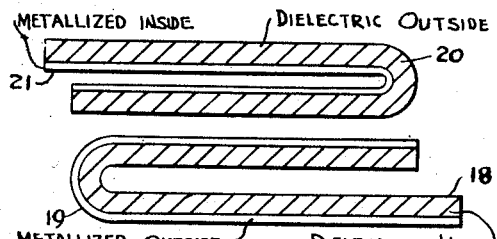
Figure 2 is similar to Figure 1 except that one sheet or strip has been folded with its metallized surface outside.

In Figure 2 one strip 18 of metallized dielectric is folded with the metal surface 19 facing outwardly. This arrangement gives a greater capacity since only one layer of dielectric is interposed between oppositely polarized metallized surfaces. Sheet 20 with metal layer 21 is the same as sheet 10.

When this form of capacitor is rolled, as shown in Figure 6, the projecting and exposed metallized surfaces at each end are sprayed to unite the turns as described in connection with Figure 6. Suitable terminal electrodes are then added.

Figure 3:
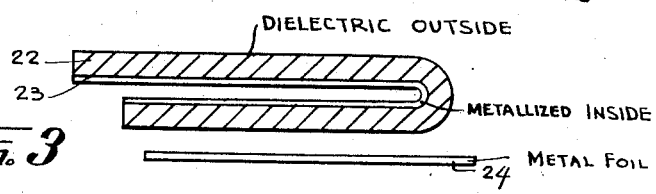
Figure 3 is similar to Figure 1 except that only one folded strip is used and the other strip is plain metal foil.

Figure 3 utilizes a single folded sheet 22 with the metallized surface 23 inside as the electrode. The sheet 24 is ordinary foil. This arrangement is more compact occupying, when rolled, a minimum cubical space per square inch of effective surface area. It is especially suitable with polyester films such as "Mylar" as the dielectric.

Figure 4:
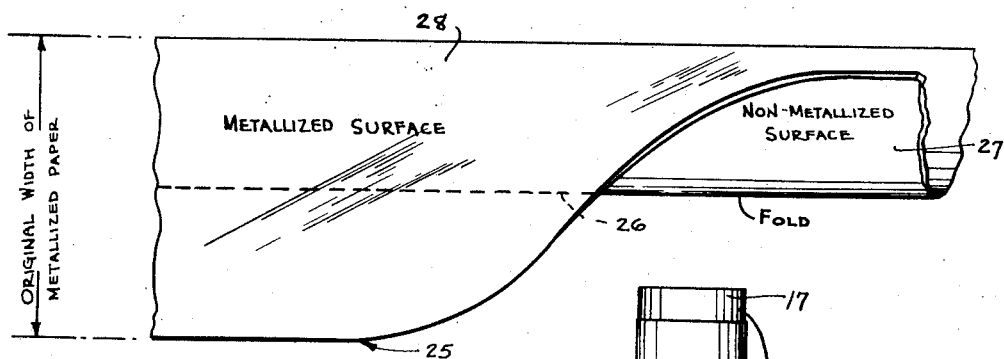
Figure 4 is a plan view of a portion of the metal-coated sheets after folding in accordance with the arrangement shown in Figure 1 and the same method will produce sheets with the metal surface outside if the direction of folding is reversed.

Figure 4 shows a sheet of paper 25 in the process of being folded slightly off the center-line 26, with the nonmetallized surface 27 on the outside and the metallized surface 28 inside. Any convenient method known to the paper industry may be used for the folding operation. This operation will produce the strips of Figures 1 to 3 inclusive depending on the direction of fold.

In Figure 5 I have shown two metallized sheets A and B, folded in accordance with the method disclosed in Figures 1 or 2, wherein the sheets are displaced laterally to permit the exposed edges of each folded sheet to protrude slightly beyond the capacity forming area. A portion of the top surface of each sheet has been cut away in the drawing to show the presence of metallization on the inside of each fold.

Figure 7A:
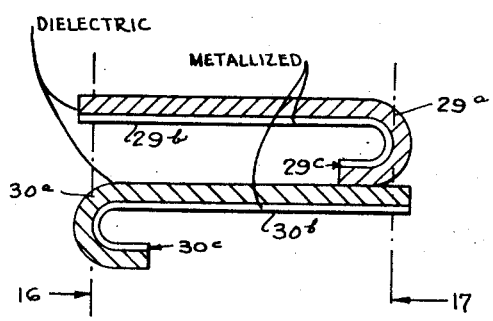
Figure 7A is a sectional end-view showing a modified method of folding.
Figure 7:
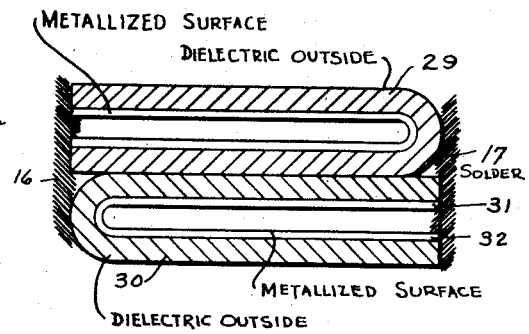
Figure 7 is a sectional end-view of two metallized sheets like those shown in Figure 1, but with the folding modified to produce sheets without extending the edges.

Figure 7 illustrates a modification in the method of folding the sheets. Here the sheets 29 and 30 are folded so that the edges of each folded sheet, such as the edges 31 and 32 are even. The sheets as shown in Figure 7 are laid up as described in connection with Figure 1.

When the sheets of Figure 7 are rolled up to form a capacitor as shown in Figure 6, the extreme outer edges of the metallized portions of the sheets are in lengthwise relation to the solder caps 16 and 17 as these metallic edges extend outwardly to the extreme outer surface of the ends of the rolled unit and thus present a double thickness of metal.

Figure 7A illustrates a further modification in the method of folding the sheets. Here sheets 29a and 30a have one side completely covered from edge to edge by the metallized coatings 29b and 30b and one longitudinal edge 29c, 30c is folded over as shown. The sheets are then laid up as shown, the capacitor is rolled up as shown in Figure 6 and the solder 16, 17 applied at each end to form terminals as previously described.

Figure 8:
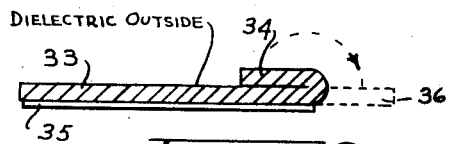
Figure 8 is a sectional view of a modified form of sheet wherein the sheet is folded before applying the metallic coating thereto so as to leave a non-coated edge.
Figure 9:
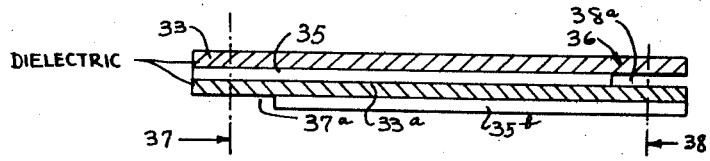
Figure 9 shows two sheets as shown in Figure 8 placed together to form a capacitor.

Figures 8 and 9 illustrate a further modification in the method of folding the sheets. Here the sheet 33 has one longitudinal edge 34 folded against the surface of the front of the sheet and while said edge so folded is held in the position shown—or in any other position where it will not be metallized—the metallic coating 35 is applied to the rear of the sheet. The edge 34 is then unfolded to the position indicated at 36 and a sheet so constructed is used in a capacitor as shown in Figure 9. Here sheet 33 is opposed to a second sheet 33a having coating 35b thereon. The capacitor is rolled up as shown in Figure 6 and the solder applied to the edges up to the dotted lines 37 and 38, thereby contacting the edges of the metallized portions 35 and 35b, but not extending into the spaces 37a and 38a thereby preventing short-circuits at these points.

It will be noted that a strip folded according to Figure 7 can be used to make a capacitor comprising a metallized dielectric strip and metallic strip in the manner shown by Figure 3.

It is of course to be understood that the invention is not limited to the forms shown, but may be modified to cover many other folding combinations. All of the forms shown and described permit the use of fully metallized dielectric sheets from which no metal needs to be removed. Today this removal is considered to be a necessary procedure in the construction of metallized dielectric capacitors and constitutes an extremely expensive and somewhat unsatisfactory operation. By folding the metallized sheets in the manners outlined herein this operation is eliminated and the cost of manufacture appreciably reduced.

For the sake of illustration, rolled capacitors have been referred to. It will be noted that so called "Stacked" capacitors may be fabricated, using the strips or sheets herein disclosed.

Also, it will be noted that the strips herein disclosed are composed of dielectric of sufficient thickness to be handled, usually of from .0002" to .002". The metallized coatings on such dielectric are usually of the magnitude of microns in thickness, and have no mechanical strength and cannot be handled apart from the dielectric. This construction should be clearly distinguished from sheets or strips having a foil base of substantial thickness so it can be handled, and on which the dielectric is sprayed or otherwise applied.

What is claimed is:

1. A metallized electrical capacitor comprising a strip of insulating material provided on one side with an adherent metallized coating extending to the extreme lateral edges of the strip, said strip being folded longitudinally to have one of its lateral edges extending beyond the other edge and with the outer surface of the folded strip being the insulating surface thereof, a strip of metal foil superimposed upon said first strip in contact with said insulating surface and having one longitudinal edge extending outwardly from the folded edge of said first strip and having its opposite longitudinal edge spaced inwardly from the lateral edges of said first strip, said strips being wound together into a convolute capacitor unit, whereby said insulating strip forms the sole dielectric and said metallized coating forms the sole electrode layer of one polarity of the capacitor, and electrical terminal means connected to the projecting edges of said extending metallized coating and said metal strip, respectively.

2. A metallized electrical capacitor comprising at least one insulating strip provided on one side with an adherent metallized coating extending to the extreme lateral edges of the strip and forming an electrode layer of one polarity of the capacitor, said strip being folded along a longitudinal line with at least one of the lateral edges of said coating extending to the edge of the folded strip opposite to the fold thereof, and a further metal layer forming an electrode of opposite polarity of the capacitor, said strip and layer being superimposed and wound together into a convolute capacitor unit, whereby said layer and coating forming the sole electrodes and said insulating strip constitutes the sole dielectric of the capacitor, and electrical terminal means connected to the exposed edges of said coating and said layer, respectively.

3. A metallized electrical capacitor comprising a pair of insulating strips provided on one side with adherent metallized coatings extending to the extreme lateral edges of the strips, said strips being folded along a longitudinal line with the edges thereof in register and with the metallized coatings on the inside of the folded strips, said folded strips being superimposed with the fold of one strip registering with the edges of the other strip and the superimposed folded strips being wound together into a convolute capacitor unit, whereby said strips constitute the sole dielectric and said metallized coatings form the sole electrode layers of the capacitor, and electrical terminal means connected to the exposed edges of the metallized coatings of said strips.

4. A metallized electrical capacitor comprising an insulating strip provided on one side with an adherent metallized coating extending to the extreme lateral edges of the strip, said strip being folded along a longitudinal line with the outer surface of the folded strip being the insulating surface thereof, to provide a pair of overlapping contacting portions of said metallized coatings, a metal strip superimposed upon the folded insulating strip and having one longitudinal edge protruding outwardly from the folded edge of said first strip and having its opposite longitudinal edge spaced inwardly from the edges of the coating of said first strip, said strips being wound together into a convolute capacitor unit, whereby said first strip constitutes the sole dielectric and said metallized coating forms the sole electrode layer of one polarity of the capacitor, and electrical terminal means connected to the exposed edges of said coating and of said metal strip, respectively.

5. A metallized electrical capacitor comprising an insulating strip provided on one side with an adherent metallized coating extending to the extreme lateral edges of the strip, said strip being folded along a longitudinal center line with the outer surface of the folded strip being the insulating surface thereof, a metal strip superimposed upon the folded insulating strip and having one longitudinal edge spaced inwardly from the free edges of said first strip and having its opposite longitudinal edge protruding outwardly from the folded edge of said first strip, said strips being wound together into a convolute capacitor unit, whereby said first strip constitutes the sole dielectric, said metallized coating forms the sole electrode layer of one polarity and said metal strip forms the electrode layer of opposite polarity of the capacitor, and electrical terminal means connected to the exposed edges of said metallized coating and of said metal strips, respectively.

References Cited in the file of this patent

UNITED STATES PATENTS

| 965,992 | Dean | Aug. 2, 1910 |
| 2,638,494 | Liechti | May 12, 1953 |

FOREIGN PATENTS

| 270,128 | Switzerland | Nov. 1, 1950 |